(12) United States Patent
Yang et al.

(10) Patent No.: US 8,262,275 B2
(45) Date of Patent: Sep. 11, 2012

(54) PORTABLE ELECTRONIC DEVICE

(75) Inventors: Mu-Wen Yang, Taipei (TW); Chih-Chiang Chang, Taipei (TW)

(73) Assignee: FIH (Hong Kong) Limited, Kowloon (HK)

( * ) Notice: Subject to any disclaimer, the term of this patent is extended or adjusted under 35 U.S.C. 154(b) by 353 days.

(21) Appl. No.: 12/755,488

(22) Filed: Apr. 7, 2010

(65) Prior Publication Data
US 2010/0321942 A1    Dec. 23, 2010

(30) Foreign Application Priority Data
Jun. 18, 2009  (CN) .......................... 2009 1 0303421

(51) Int. Cl.
*F21V 3/00*   (2006.01)
*F21V 19/00*  (2006.01)

(52) U.S. Cl. ........................................ 362/616; 362/315
(58) Field of Classification Search .................. None
See application file for complete search history.

(56) References Cited

U.S. PATENT DOCUMENTS
6,398,379 B1 *  6/2002  Imai ................................ 362/24
2006/0061704 A1 *  3/2006  Hayano et al. .................. 349/58

FOREIGN PATENT DOCUMENTS
CN         1252200 A      5/2000
CN         1749830 A      3/2006

* cited by examiner

*Primary Examiner* — Anh Mai
*Assistant Examiner* — Britt D Hanley
(74) *Attorney, Agent, or Firm* — Altis Law Group, Inc.

(57) ABSTRACT

A portable electronic device comprises a housing, a display protecting lens, a display and a light guiding element. The housing has an opening and a trough defined therethrough. The display protecting lens is mounted in the opening of the housing. The display is mounted with the first light guiding element in the housing. The light guiding element is accommodated in the trough. The portable electronic device further includes a light guiding member located between the display protecting lens and the display, a portion of the light emitted by the display is guided by the light guiding member and then transmitted to the light guiding element.

8 Claims, 3 Drawing Sheets

PORTABLE ELECTRONIC DEVICE

CROSS-REFERENCE TO RELATED APPLICATIONS

This application is related to co-pending U.S. patent application Ser. No. 12/755,486, entitled "PORTABLE ELECTRONIC DEVICE", by Yang et al. The application has the same assignee as the present application and has been concurrently filed herewith. The above-identified applications are incorporated herein by reference.

BACKGROUND

1. Technical Field

The exemplary invention generally relates to housings and portable electronic devices using the housings.

2. Description of Related Art

Portable electronic devices with wireless communication modules, such as mobile phones, are widely used in work, everyday life, and even entertainment. Consumers consider purchase mobile phones not only because of their communication capabilities, but also because of their appearances.

Typically, to improve the external appearance and quality of an outer housing of the portable electronic device, a light emitting member, such as a LED is mounted to an outer surface of the housing to emit an attractive light around the housing. However, light emitting members for improving the external appearance of the housing will consume additional power from the portable electronic device.

Therefore, there is a room for improved in the arts.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the exemplary housing and method making the housing. Moreover, in the drawings like reference numerals designate corresponding parts throughout the several views. Wherever possible, the same reference numbers are used throughout the drawings to refer to the same or like elements of an embodiment.

DETAILED DESCRIPTION OF THE EMBODIMENTS

Figure 1:
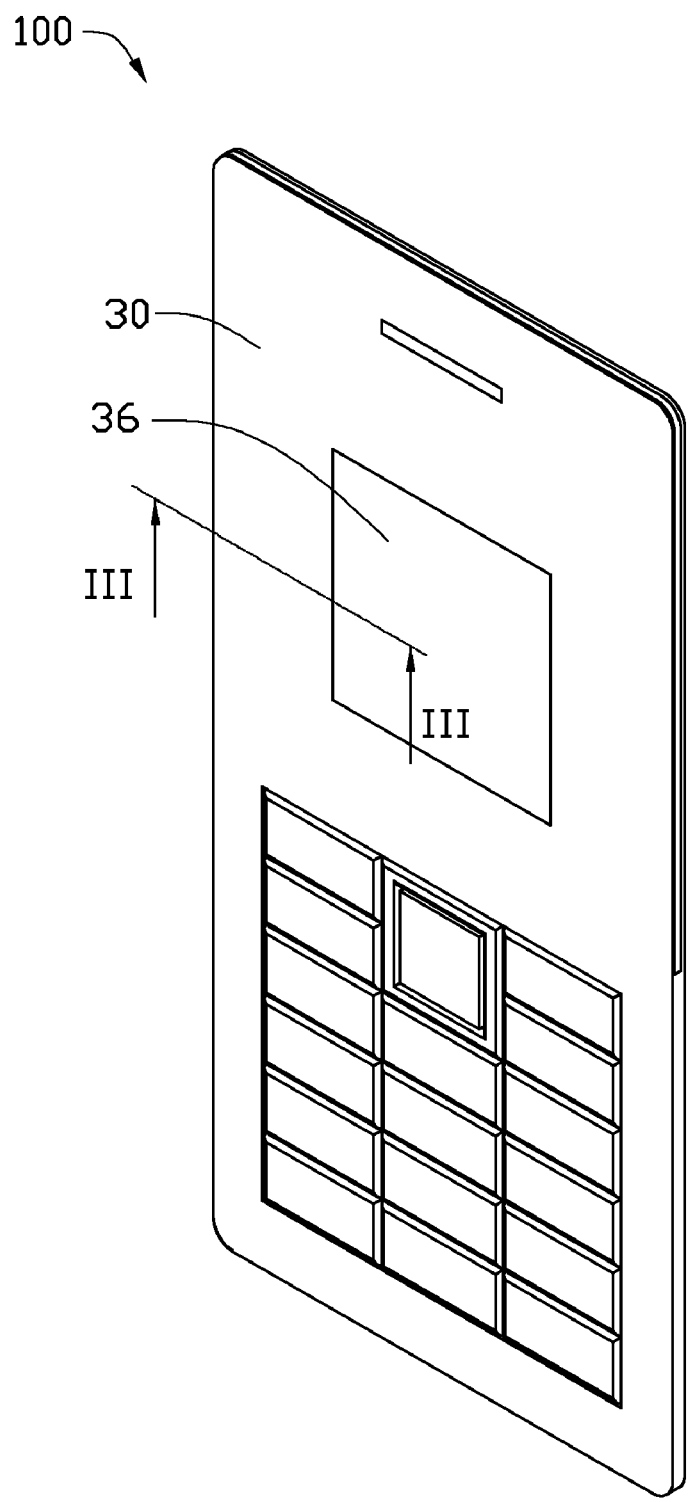
FIG. 1 is an assembled view of a portable electronic device using an exemplary embodiment of a light guiding module.
Figure 2:
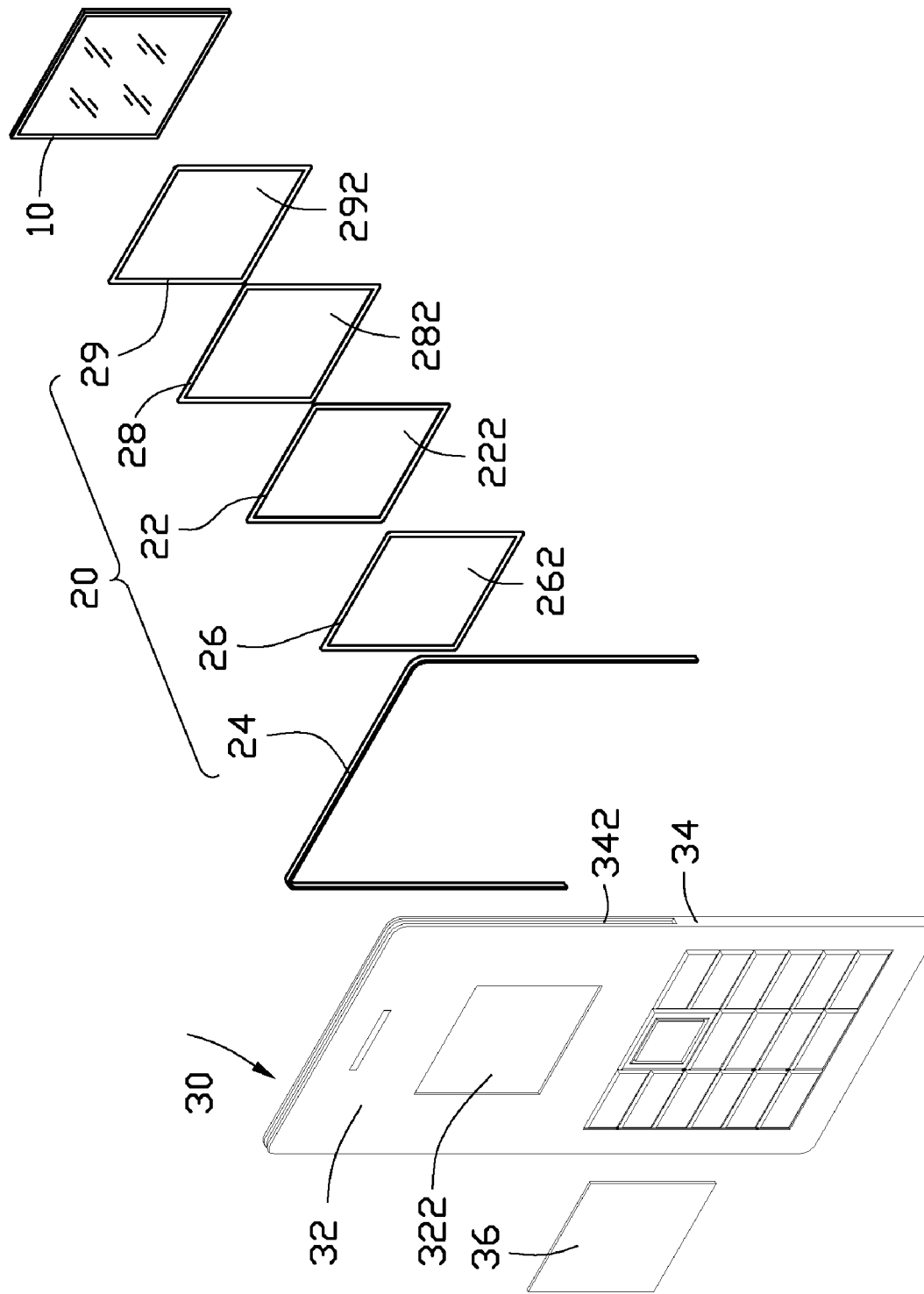
FIG. 2 is exploded view of the portable electronic device shown in FIG. 1.

Referring to FIG. 1 and 2, an exemplary portable electronic device 100 includes a display 10, a light guiding module 20 and a housing 30. The light guiding module 20 and the display 10 are both mounted on the housing 30, to make the housing 30 emitting a light that improves the outer appearance of the housing 30.

The display 10 may be any traditional display 10, such as LCD, LED. The display 10 displays the data for the portable electronic device 100. According to the invention, the display 10 also acts as a light source for illuminating the light guiding module 20, so that the portable electronic device 100 does not need an additional light emitting element for improving the outer appearance of the housing 30.

The light guiding module 20 includes a first light guiding member 22, a second light guiding member 24, a first gasket 26, a second gasket 28 and an adhesive layer 29. The first light guiding member 22 is transparent or translucent so that the light transmitted to the first light guiding member 22, such as from the display 10, can pass through the first light guiding member 22 or be guided toward an outer surface of the first light guiding member 22. The first light guiding member 22 may be of any perimeter shape, but including a hole 222 defined therethough. The first light guiding member 22 corresponds in shape and size to that of the display 10. The first gasket 26, the second gasket 28 and the adhesive layer 29, all of which have the same shape and size of that of the first light guiding member 22, and each of which has a hole 262, 282, 292 defined therethrough, respectively. The first gasket 26 and the second gasket 28 are respectively mounted on opposite sides of the first light guiding member 22, the adhesive layer 29 is mounted on the side of the second gasket 28 opposite to the first light guiding member 22. The second light guiding member 24 can be of any shape, such as U-shaped as shown herein. The second light guiding member 24 is transparent or translucent so that the light transmitted to the second light guiding member 24, such as from the first light guiding member 22, can pass through the second light guiding member 24 or be guided toward an outer surface of the second light guiding member 24. The light guiding member 22 and a second light guiding member 24 can be made of one or more materials selected from a group consisting of polyvinyl chloride (PVC), polycarbonate, polystyrene, and any other thermoplastic resins.

The housing 30 includes a main body 32 of any shape, such as rectangular as shown herein. The housing 30 has an opening 322 defined through main body 32 and a frame 34 protruding from the main body 32 surrounding the opening 322. The housing 30 further has a trough 342 defined through the frame 34 around the opening 322 and a lens protecting lens 36 accommodated in the opening for protecting the display 10 from damage. The trough 342 corresponds to the second light guiding member 24 and accommodates and retains the second light guiding member 24 therein.

Figure 3:
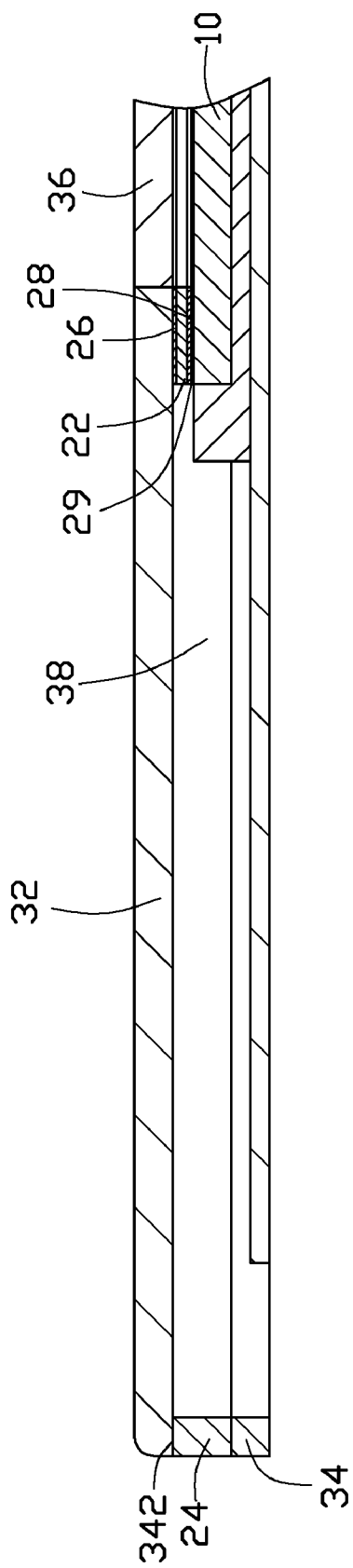
FIG. 3 is a partially enlarged and cross-sectional view of the portable electronic device shown in FIG. 1.

Referring to FIGS. 3 and 4, during assembly: first, the display protecting lens is accommodated and retained (e.g., hot-melted) in the opening 322 of the housing 30. Secondly, the second light guiding member 24 is firmly accommodated in the trough 342 of the housing 30. Then, the first gasket 26 and the second gasket 28 are respectively mounted on opposite sides of the light guiding member 22, the adhesive layer 29 is mounted on the side of the second gasket 28 opposite to the light guiding member 22. The holes 222, 262, 282, 292 are aligned with each other. After that, the display 10 is placed on the other side of the adhesive layer 29, so the second light guiding member 24, the first gasket 26, the second gasket 28, the adhesive layer 29 and the display 10 are integrally assembled into a module (not labeled). Finally, the assembled module is mounted on housing 30 aligned with the display protecting lens 36. A passage 38 is formed between the light guiding member 22 and the second light guiding member 24.

In use, most of the light emitted by the display 10 is transmitted through the display protecting lens 36 for user viewing of the device data, etc., through the holes 292, 282, 222, 262. The rest of the light emitted by the display 10 is transmitted to and guided by the light guiding member 22 until transmitted through the passage 36, then reaching to and guided by the second light guiding member 24. Thus, the second light guiding member 24 is illuminated to externally decorate the housing 30, especially when the second light guiding member 24 is made of colorful material, the second light guiding member 24 would emit a light therethrough corresponding to the colorful material.

The second light guiding member 24 and the housing 30 may be integrally molded together.

Even through numerous characteristics and advantages of the exemplary invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A portable electronic device, comprising:
   a housing having an opening and a trough defined therethrough;
   a display protecting lens mounted in the opening of the housing;
   a display located in the housing and aligning with the display protecting lens; and
   a first light guiding member accommodated in the trough;
   wherein the portable electronic device further includes a second light guiding member located between the display protecting lens and the display, a portion of the light emitted by the display is guided by the second light guiding member and then directly arrives at the first light guiding member and is transmitted by the first light guiding member.

2. The portable electronic device as claimed in claim 1, wherein the housing has a main body and a frame protruding from periphery of the main body, the opening is defined through the main body, the trough is defined through the frame.

3. The portable electronic device as claimed in claim 1, wherein the first light guiding member and the housing are integrally molded together.

4. The portable electronic device as claimed in claim 1, wherein the first light guiding member is made of one or more materials selected from a group consisting of polyvinyl chloride, polycarbonate, polystyrene.

5. The portable electronic device as claimed in claim 1, wherein the second light guiding member is made of one or more materials selected from a group consisting of polyvinyl chloride, polycarbonate, polystyrene.

6. A portable electronic device, comprising:
   a housing having a main body, an opening defined through the main body, a frame protruding from periphery of the main body surrounding the opening, and a trough being defined through the frame;
   a display protecting lens having a wall mounted in the opening of the housing;
   a display aligning with the display protecting lens and located in the housing; and
   a first light guiding member accommodated in the trough;
   wherein the portable electronic device further includes a second light guiding member located between the display protecting lens and the display, and a passage is defined between the first light guiding member and the second light guiding member.

7. The portable electronic device as claimed in claim 6, wherein the first light guiding member is made of one or more materials selected from a group consisting of polyvinyl chloride, polycarbonate, polystyrene.

8. The portable electronic device as claimed in claim 6, wherein the second light guiding member is made of one or more materials selected from a group consisting of polyvinyl chloride, polycarbonate, polystyrene.

* * * * *